United States Patent [19]

Adams

[11] Patent Number: 4,526,446
[45] Date of Patent: Jul. 2, 1985

[54] ADJUSTABLE AUXILIARY REAR-VIEW MIRROR

[76] Inventor: Richard W. Adams, 3404 Dover Rd., Pompano Beach, Fla. 33062

[21] Appl. No.: 505,925

[22] Filed: Jun. 20, 1983

[51] Int. Cl.³ .......................... G02B 5/08; G02B 5/10; G02B 7/18
[52] U.S. Cl. ................................. 350/624; 350/625; 350/626; 350/632
[58] Field of Search ............... 350/624, 625, 626, 631, 350/632

[56] References Cited

U.S. PATENT DOCUMENTS

| | | | |
|---|---|---|---|
| 2,137,286 | 11/1938 | Herbig | 350/632 X |
| 3,104,274 | 9/1963 | King | 350/625 |
| 3,146,296 | 8/1964 | Fischer | 350/625 |
| 3,337,285 | 8/1967 | Travis | 350/61 |
| 3,375,053 | 3/1968 | Ward | 350/625 |
| 3,404,935 | 10/1968 | Creager | 350/303 |
| 4,182,552 | 1/1980 | Feinbloom | 350/303 |
| 4,200,359 | 4/1980 | Lawson | 350/303 |
| 4,223,983 | 9/1980 | Bloom | 350/303 |

Primary Examiner—John K. Corbin
Assistant Examiner—Richard F. Gallivan
Attorney, Agent, or Firm—Oltman and Flynn

[57] ABSTRACT

An auxiliary convex rear-view mirror for stick-on attachment to a larger flat rear-view mirror on the outside of a vehicle. The auxiliary mirror has a wedge-shaped base and a wedge-shaped adjusting ring carrying a convex mirror piece and rotatably adjustable on the base about an axis extending oblique to the larger flat mirror. The convex mirror piece is spherical about an axis which extends at an acute angle to the rotational axis of the adjusting ring.

7 Claims, 5 Drawing Figures

U.S. Patent  Jul. 2, 1985  4,526,446
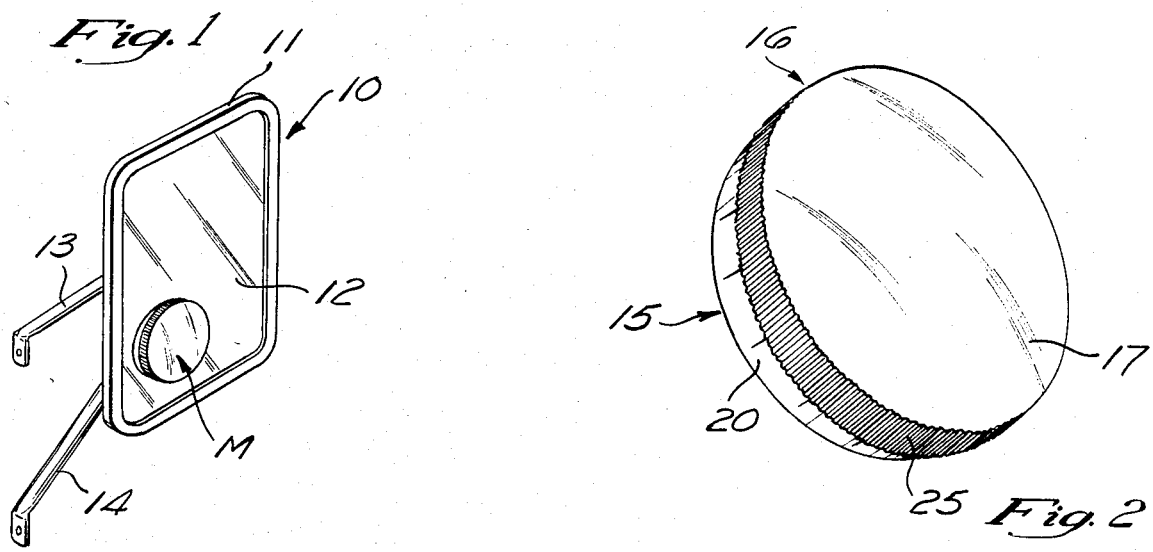
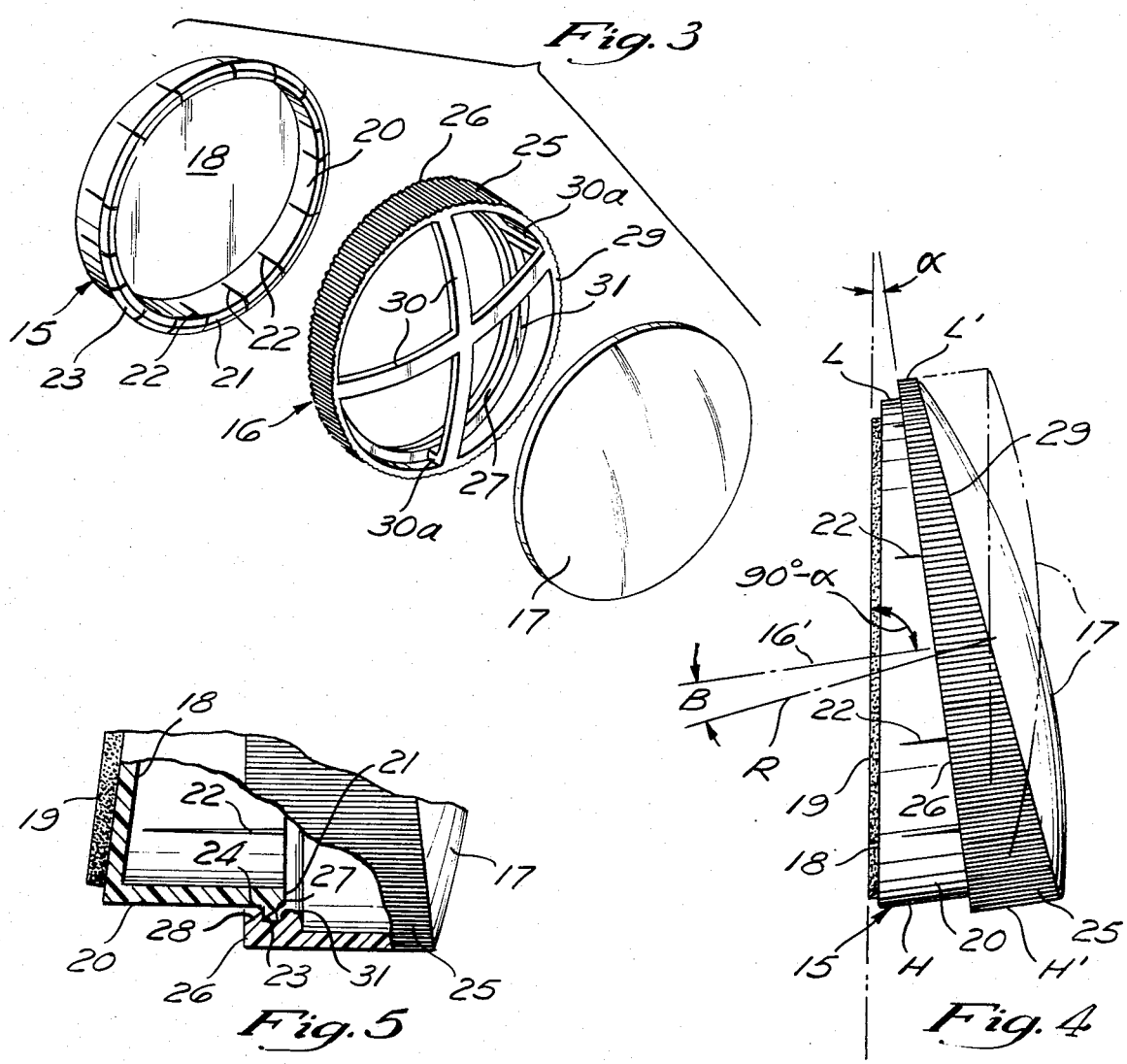

ADJUSTABLE AUXILIARY REAR-VIEW MIRROR

SUMMARY OF THE INVENTION

This invention relates to an adjustable auxiliary rear-view mirror for attachment to a larger rear-view mirror on either side of a truck, van or similar vehicle to improve the driver's visibility to the rear.

In accordance with a presently preferred embodiment, the auxiliary mirror of the present invention comprises a circular wedge-shaped base for attachment to the larger rear-view mirror, and a wedge-shaped ring carrying a convex mirror piece and rotatably adjustable on the base to selectively determine the viewing direction to the rear which is provided by that convex mirror piece.

A principal object of this invention is to provide a novel auxiliary rear-view mirror for attachment to a conventional larger rear-view mirror on the outside of a vehicle.

Another object of this invention is to provide such an auxiliary rear-view mirror which is adjustable to selectively change the viewing direction it provides to suit the requirements and preferences of different drivers or different driving conditions they encounter.

Another object of this invention is to provide an auxiliary rear-view mirror of novel adjustable construction which is readily attachable adhesively at any desired location on a conventional larger rear-view mirror on one side or the other of a vehicle, such as a truck or van.

Further objects and advantages of this invention will be apparent from the following detailed description of a presently preferred embodiment which is illustrated schematically in the accompanying drawing.

DESCRIPTION OF THE DRAWING

FIG. 1 is a perspective view of the present auxiliary rear-view mirror mounted on a larger convention rear-view mirror on the passenger's side of a truck, van or similar vehicle;

FIG. 2 is a perspective view of the present auxiliary rear-view mirror in its assembled condition;

FIG. 3 is an exploded perspective view of this mirror;

FIG. 4 is a side elevation showing the mirror in full lines in one adjusted position and in phantom in a different adjusted position; and FIG. 5 is a fragmentary view, partly in longitudinal section and partly in elevation, showing how the base and the adjustable ring in the present mirror fit together.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

As shown in FIG. 1, the usual outside rear-view mirror 10 for the front seat passenger's side of a truck, van or the like is shown as comprising a generally rectangular peripheral frame 11 holding a flat rearwardly facing mirror 12 and attached to the body of the vehicle by upper and lower mounting arms 13 and 14. The adjustable mirror M of the present invention is adhesively mounted on the mirror 12 at any convenient location, here shown as near the lower inside corner of mirror 12.

It is to be understood that essentially the same arrangement, except reversed from left to right, can be provided on the driver's side. That is, the mounting arms 13 and 14 would be on the right side of the mirror frame 11. The adjustable mirror M would be positioned to give the driver optimum visibility to the rear.

Referring to FIG. 2, the mirror M comprises a circular wedge-shaped base 15, a rotatably adjustable, circular wedge-shaped ring 16, and a circular, convex, rearwardly facing, reflective panel 17 extending across the back of ring 16. Both base 15 and ring 16 are of suitable molded plastic material. The convex panel 17 may be formed integral with ring 16 or permanently joined to it by a suitable adhesive. The reflective convex surface of panel 17 may be formed by vacuum metallizing, for example.

Referring to FIG. 4, the base 15 of mirror M has a flat circular front wall 18, the front of which is covered by a double-sided pressure-sensitive adhesive tape 19 which enables it to be applied manually to the rearwardly facing surface of the main rear-view mirror 12. The base 15 also has a cylindrical side wall 20 extending rearward from its end wall 18 and of progressively changing depth along its circumferential extent so as to be about three times as deep at its high point (H in FIG. 4) as at its low point L diametrically opposite the high point.

The side wall 20 terminates in a flat circular rear edge 21 (FIG. 5) lying in a plane which extends perpendicular to the cylindrical axis of side wall 20. The plane of the rear edge 21 extends at a small acute angle to the plane of the front wall 18.

At evenly spaced intervals (such as 22½ degrees) circumferentially, the base is formed with tapered slits 22 (FIG. 5) in its side wall 20 extending forward from its rear edge 21 to the front end wall 18. These slits enable the rear end of the side wall 20 of the base to be slightly compressed radially for a purpose explained hereinafter.

Just in front of its rear edge 21, the side wall 20 of the base is formed with an outwardly and forwardly inclined surface 23 (FIG. 5) which terminates in a radially inwardly extending shoulder 24 extending parallel to the rear edge 21. These surfaces 23 and 24 together define an outwardly protruding lip on the outside of the side wall of the base which is divided into successive arcuate segments by the longitudinal slits 22.

In one practical embodiment, the outside diameter of the side wall 20 of the base in front of shoulder 24 is 3.25 inch, its wall thickness is 0.06 inch, its maximum depth (at point H) is 0.75 inch, and its minimum depth (at point L) is 0.25 inch.

The adjustable ring 16 has a cylindrical side wall 25 which is serrated on the outside to enable it to be more easily grasped and turned and also to reduce any reflection of light from this side wall. Side wall 25 terminates at a flat, circularly extending, front edge 26 of ring 16. Near its front end, the ring 16 is formed with an internal circumferential groove 27 which is evenly spaced rearward from the front edge 26 of the ring. This groove snugly receives the rear lip 23,24 on the base 15, as shown in FIG. 5. In front of this groove, the inside surface of the side wall 25 of ring 16 has a forwardly and outwardly inclined surface 28 which slides forward over the tapered surface 23 on the rear lip of base 15 when the ring 16 is assembled onto the base. The slits 22 in the base enable the arcuate segments of its side wall 20 to flex inwardly to facilitate the snap-on assembly of ring 16.

The depth (i.e., axial dimension) of the side wall 25 of ring 16 changes progressively along its circumferential extent so as to be about five times as deep at its high point (H' in FIG. 4) as at its low point L' diametrically opposite. The front edge 26 of the side wall 25 lies in a plane which extends perpendicular to the cylindrical axis of this side wall. The rear edge 29 of side wall 25 extends at a small acute angle to the plane of its front edge 26. At its rear end the ring 16 has cross pieces 30 which provide a rigid support for the mirror piece 17, which has a concave front face engaging these cross pieces and a convex rear face which provides the reflective surface of mirror M. In one practical embodiment this reflective surface is spherical, the radius of the sphere being 5.0 inches. As shown in FIG. 4, a radius R of this spherical curvature which intersects the center C of mirror piece 17 extends perpendicular to the plane of the rear edge 29 of side wall 25 and at a large acute angle to the plane of its front edge 26.

The cross pieces 30 have forwardly extending longitudinal legs 30a which extend along the inside of the side wall 25 of ring 16 to the internal circumferential flange 31 behind groove 27. These legs 30a prevent over-insertion of ring 16 on base 15 because they would engage the lip 23,24 on the base if it got behind groove 27 during the assembly of the base and the ring.

Preferably, the base 15 of mirror M is adhesively mounted on the main rear-view mirror 10 with its high point H toward the cab of the vehicle and its low point L away from the cab.

As shown in FIG. 4, the plane of the rotational connection between ring 16 and base 15 (at groove 27 and lip 23,24) extends at a small acute angle α to the plane of the main rear-view mirror 12 on which base 15 is mounted. (This is the same as the angle between the rear edge 21 and the front wall 18 of base 15). Therefore, the rotational axis 16' of ring 16 extends at an angle of [90°−α] to the plane of the main rear-view mirror 12.

The spherical axis of the convex mirror piece 17 extends at a small acute angle B to the rotational axis 16' of ring 16 because of the wedge shape of this ring. (This is the same as the angle between the rear edge 29 and the front edge 26 of ring 16).

To position the convex mirror piece 17 generally parallel to the flat mirror 12, the ring 16 may be rotated on base 15 to a position in which the low point L' of the side wall 25 of the ring is aligned with the high point H of the side wall 20 of the base.

The opposite extreme adjustment of mirror M is effected by rotating ring 16 on base 15 until the high point H' of the ring's side wall 25 is at the high point H of the side wall 20 of base 15. In this position the convex mirror piece 17 is tipped laterally outward the maximum amount.

Between these two extremes, the ring 16 can be adjusted to tip the convex mirror piece 17 outward and upward or outward and downward to suit the driver's requirements for optimum visibility to the rear of the vehicle.

Various auxiliary mirrors with a spherical convex surface like that of mirror piece 17 have been attached to larger flat rear-view mirrors on one or both sides of vehicles, such as trucks, vans, motor homes and campers, where the driver's seat is relatively high above the road. However, when the larger flat mirror is positioned to give the driver an optimum view of the road behind, the auxiliary convex mirror tends to fill up much of the driver's field of vision with the side of the vehicle itself. Also, if the driver's eyes are at a higher level than the main rear-view mirror, that mirror will be tipped upward and the convex auxiliary mirror tends to show the driver a lot of sky, leaving dangerous blind spots near the side of the vehicle.

Also, various rectangular convex auxiliary mirrors have been used which are tipped outward to largely alleviate the problem of filling up the driver's field of vision with the side of the vehicle. However, such auxiliary mirrors do not adequately overcome the problem of showing excessive sky, leaving blind spots.

Also, various convex auxiliary mirrors are known which are mechanically mounted independent of the main rear-view mirror and are separately adjustable. However, the mounting of such auxiliary mirrors presents problems of convenience and esthetics, and often they tend to vibrate to an annoying extent when the vehicle is moving.

The present invention combines the convenience and esthetic desirability of the "stick-on" positioning of the auxiliary mirror on the main rear-view mirror with the important functional characteristic of adjustability to suit the driver's convenience and improve the safety with which the driver can operate the vehicle.

I claim:

1. An auxiliary rear-view mirror for adhesive attachment to the flat rear face of a larger outside rear-view mirror on a vehicle, said auxiliary mirror comprising:
   a circular wedge-shaped base having a flat front end wall for adhesive attachment to the larger rear-view mirror, and a cylindrical wedge-shaped side wall extending rearward from said front end wall at an oblique angle to the latter;
   an adjusting ring extending rearward from said base and having a cylindrical wedge-shaped side wall coupled to said side wall of the base for rotatable adjustment on the base about an axis which extends at an oblique angle to said front end wall of the base;
   and a mirror piece on the back end of said ring, said mirror piece having a rearwardly facing convex reflective face of which is spherical about an axis which extends at an acute angle to said axis about which the ring is rotatably adjustable.

2. An auxiliary rear-view mirror according to claim 1 wherein:
   said ring has an internal circumferential groove in its side wall, and said base has an external circumferential lip on its side wall received in said groove to couple said ring to said base for said rotatable adjustment.

3. An auxiliary rear-view mirror according to claim 2, wherein:
   said ring is formed with said internal circumferential groove near its front end;
   and said base is formed with said external circumferential lip near its back end and a plurality of circumferentially spaced longitudinal slots which are open at their back end and divide said lip into arcuate segments which can flex radially inward to facilitate the snap-on assembly of said ring and said base.

4. An auxiliary rear-view mirror according to claim 2, wherein:

said side wall of the adjusting ring has surface irregularities on the outside to facilitate grasping it securely manually and reduce light reflection from it.

5. An auxiliary rear-view mirror according to claim 1, and further comprising:

a double-faced adhesive tape on said front wall of the base for attaching it to said larger rear-view mirror.

6. An auxiliary rear-view mirror according to claim 5, wherein:

said ring is formed with an internal circumferential groove near its front end; said base is formed with an external circumferential lip near its back end snugly received in said groove to provide a rotatable coupling between the ring and the base, said base having a plurality of circumferentially spaced longitudinal slots which are open at their back end and divide said lip into arcuate segments which can flex radially inward to facilitate the snap-on assembly of said ring and said base; and said side wall of the adjusting ring is serrated on the outside.

7. An auxiliary rear-view mirror for attachment to a larger rear-view mirror on the outside of a vehicle, said auxilary mirror comprising:

a base, means for attaching said base to said larger rear-view mirror;

a mirror piece presenting a convex spherical reflective face with a center, said reflective face of the mirror piece having a spherical axis passing through said center;

a mirror support member rotatably adjustable on said base and supporting said mirror piece behind said base with said convex reflective face of the mirror piece facing rearward;

and means on said base and said mirror support member and acting between them to confine said mirror support member for rotatable adjustment about a single axis which extends at an oblique angle to said larger rear-view mirror;

said spherical axis of said mirror piece extending at an acute angle to said axis about which said mirror support member is rotatably adjustable on said base.

* * * * *